United States Patent
Zhao et al.

(10) Patent No.: US 8,032,757 B1
(45) Date of Patent: Oct. 4, 2011

(54) METHODS AND APPARATUS FOR CONTENT FINGERPRINTING FOR INFORMATION LEAKAGE PREVENTION

(75) Inventors: Xiaoming Zhao, Jiangsu (CN); Gang Chen, Jiangsu (CN); Kan Dong, Jiangsu (CN)

(73) Assignee: Trend Micro Incorporated, Tokyo (JP)

( * ) Notice: Subject to any disclaimer, the term of this patent is extended or adjusted under 35 U.S.C. 154(b) by 723 days.

(21) Appl. No.: 12/122,003

(22) Filed: May 16, 2008

(51) Int. Cl.
*G06F 21/00* (2006.01)

(52) U.S. Cl. .......................... 713/176; 380/28

(58) Field of Classification Search .................. 713/168, 713/176, 179, 189, 190; 726/2, 6, 22–24; 707/999.001–999.006; 341/50, 51; 382/200, 382/216
See application file for complete search history.

(56) References Cited

U.S. PATENT DOCUMENTS

| | | | |
|---|---|---|---|
| 6,611,213 B1 * | 8/2003 | Bentley et al. .................. 341/51 |
| 7,503,035 B2 * | 3/2009 | Zeidman ....................... 717/123 |
| 7,702,614 B1 * | 4/2010 | Shah et al. ..................... 707/741 |
| 2003/0120647 A1 | 6/2003 | Aiken et al. | |
| 2005/0091234 A1 * | 4/2005 | Hsu et al. ...................... 707/100 |
| 2008/0028468 A1 * | 1/2008 | Yi et al. ........................... 726/23 |
| 2008/0033942 A1 * | 2/2008 | Kao et al. .......................... 707/6 |
| 2009/0024826 A1 * | 1/2009 | Zhang et al. ................... 711/216 |

OTHER PUBLICATIONS

Saul Schleimer, et al. "Winnowing: Local Algorithms for Document Fingerprinting", SIGMOD 2003, Jun. 9-12, 2003, 10 sheets.
Bloom Filters—the math, pp. 1-6, [retrieved on May 06, 2008]. Retrieved from the internet: http://pages.cs.wisc.edu/cao/papers/summary-cache/node8.html, dated 1998.

* cited by examiner

*Primary Examiner* — Gilberto Barron, Jr.
*Assistant Examiner* — Abdulhakim Nobahar
(74) *Attorney, Agent, or Firm* — Okamoto & Benedicto LLP

(57) ABSTRACT

Processes for fingerprinting a document and for preventing information leakage at a deployment point are disclosed. For fingerprinting a document, a sequence of hash values for a document is generated, a portion of said hash values to be selected as fingerprints for the document. A current window is positioned over a portion of the sequence of hash values. The hash values are examined starting from one end of the current window, and a first-encountered hash value that is 0 modulo P is selected to be a fingerprint for the current window. For information leakage prevention at a deployment point, a rolling hash calculation is performed on a target document, and a determination is made if a hash value is 0 modulo P. A first filter is applied if the hash value is 0 modulo P, and a second filter is otherwise applied. Other embodiments, aspects and features are also disclosed.

11 Claims, 6 Drawing Sheets

FIG. 3    300

| P=8 | | P=16 | |
|---|---|---|---|
| N | Pfail | N | Pfail |
| 50 | 0.0013 | 50 | 0.04 |
| 100 | 1.6E-6 | 100 | 0.0016 |
| 200 | 2.5E-12 | 200 | 2.5E-6 |
| 400 | 6.4E-24 | 400 | 6.1E-12 |

FIG. 6

METHODS AND APPARATUS FOR CONTENT FINGERPRINTING FOR INFORMATION LEAKAGE PREVENTION

BACKGROUND

1. Field of Art

The present disclosure generally relates to the fields of information security and computer software. More specifically, it relates to the field of information leakage prevention.

2. Description of the Related Art

Information leakage prevention (ILP) systems are becoming more important for enterprise computing systems. Serious information leakage accidents have caused substantial losses and have damaged corporate images. Such accidents currently occur one after the other. In addition, regulations promulgated by governments require enterprises to properly protect their digital information from leaking.

SUMMARY

Processes for fingerprinting a document and for preventing information leakage at a deployment point are disclosed. Computer apparatus for implementing said processes are also disclosed.

For fingerprinting a document, a sequence of hash values for a document is generated, a portion of said hash values to be selected as fingerprints for the document. A current window is positioned over a portion of the sequence of hash values. The hash values are examined starting from one end of the current window, and a first-encountered hash value that is 0 modulo P is selected to be a fingerprint for the current window.

For information leakage prevention at a deployment point, a rolling hash calculation is performed on a target document, and a determination is made if a hash value is 0 modulo P. A first filter is applied if the hash value is 0 modulo P, and a second filter is otherwise applied.

Other embodiments, aspects and features are also disclosed.

BRIEF DESCRIPTION OF DRAWINGS

The disclosed embodiments have other advantages and features which will be more readily apparent from the following detailed description and the appended claims, when taken in conjunction with the accompanying drawings, in which:

FIG. 6 shows a table pertaining to the scale of a second Bloom filter in accordance with an embodiment of the invention.

DETAILED DESCRIPTION

Classical 0 Mod P

Figure 1:
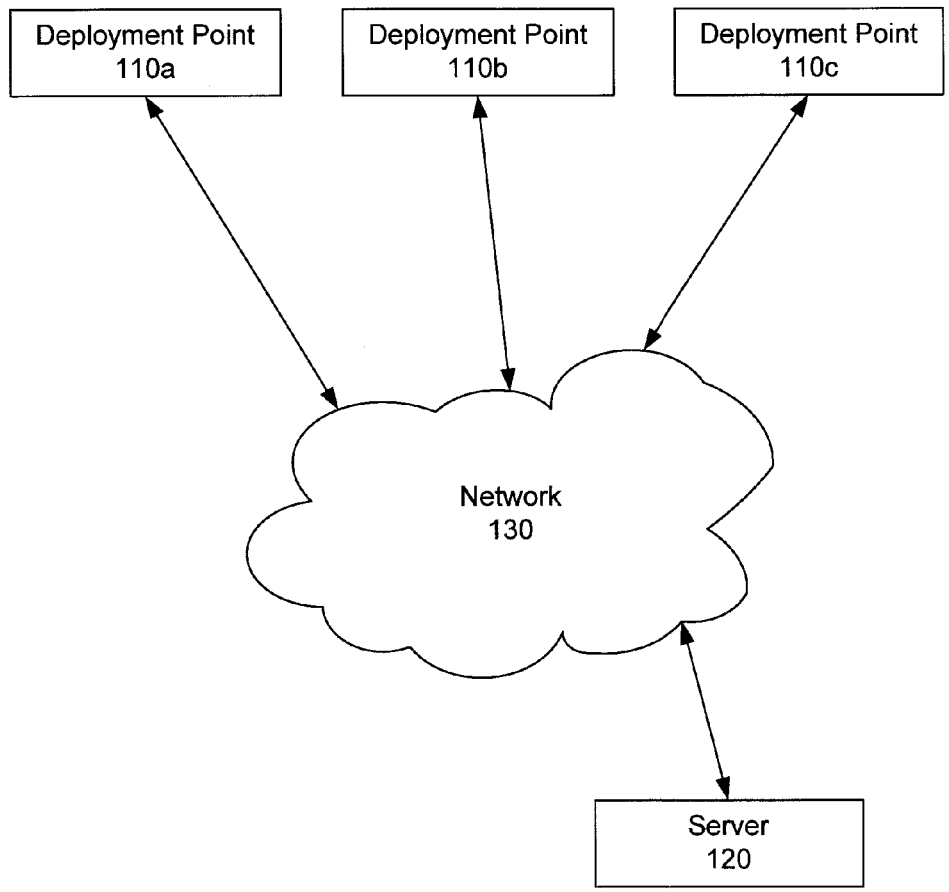
FIG. 1 is a high-level schematic diagram of an enterprise sensitive information management system in accordance with an embodiment of the present invention.

An older technique to do content fingerprinting is called "0 mod P". In this patent application, we refer to this older technique as "classical 0 mod P". Classical 0 mod P is a relatively straightforward technique, but it is not highly efficient.

A k-gram may be defined as a contiguous substring of length K from a document, where K is a parameter chosen by the user. There are almost as many k-grams as there are characters in the document, as every position in the document, except for the last (k−1) positions, marks the beginning of a k-gram.

In practical approaches to fingerprinting documents, only a small subset of the set of all k-gram hashes is retained. The classical 0 mod P approach retains all hashes that are 0 mod P, given a fixed P. Hence, only 1/P of all hashes are retained as fingerprints in this approach.

A disadvantage with the classical 0 mod P technique is that it does not include a guaranteed match feature. This is because a k-gram shared between documents is detected only if its hash is 0 mod P. This lack of a guaranteed match feature is especially problematic for applications in information leakage prevention, where it is desirable to be able to guarantee a match for sufficiently long content fractions.

Winnowing

"Winnowing" refers to a relatively efficient algorithm which has been adopted by many anti-plagiarism systems. The Winnowing algorithm is described, for example, in "Winnowing: Local Algorithms for Document Fingerprinting," Saul Schleimer, Daniel S. Wilkerson, and Alex Aiken, SIGMOD 2003, San Diego, Calif., Jun. 9-12, 2003 (hereinafter, the Schleimer paper), which is hereby incorporated by reference. The Winnowing algorithm described in the Schleimer paper guarantees to produce at least one fingerprint for any data section longer than a minimum match size parameter, S. In other words, any fractional portion of the original document with a length no less than S characters would be detected by Winnowing.

According to the Schleimer paper, the minimum match size parameter, S, is equal to K+W−1, where K is the k-gram size and W is the window size. A window of size W is defined as W consecutive hashes of k-grams in a document, where W is another parameter chosen by the user.

For example, consider the following parameter values for the window size and the k-gram size: W=200 and K=100. Using these parameters, Winnowing may be applied to a set of documents, and corresponding fingerprints may be extracted and retained. Thereafter, when a document is being examined to find a match against the set of documents, any matching content fraction longer than W+K−1=200+100−1=299 characters will be detected by Winnowing.

According to the Schleimer paper, the average density of Winnowing is proven to be 2/(W+1). That is, there will be one hash value selected to be a signature for each (W+1)/2 characters in the processed documents. For the above-described example with W=200, there will be about one hash value retained as a signature for each one hundred characters in the processed documents. Note also that hash value selection using Winnowing is position independent in that the same fraction of data will always produce the same set of fingerprints, independent of data content before or after the fraction.

Although Winnowing has some advantages, it also has substantial disadvantages. While the guaranteed match feature of Winnowing is desirable, it comes with a problem in that the fingerprint data is of relatively large size. On average, according to the density of 2/(W+1) from the Schleimer paper, about two hash values in each window are selected using Winnowing. This results in a disadvantageously large amount of data storage needed to store all the fingerprint data. It is desirable to lower the density and reduce the amount of data storage required to store the fingerprint data. This is particularly true for applications in information leakage prevention, where the fingerprint data is replicated and stored at various deployment points of a network.

The Innovative Sparse 0 Mod P Approach

An innovative approach disclosed in this patent application improves upon the classical 0 mod P and Winnowing approaches, particularly when applied in the context of an information leakage prevention system. This new approach may be referred to as the "sparse 0 mod P" technique.

Similar to Winnowing, the sparse 0 mod P technique has a guaranteed minimum match size and is an efficient technique. However, in contrast to Winnowing, the sparse 0 mod P technique has a smaller density. In other words, using the sparse 0 mod P method, the size of the fingerprint data is reduced while still maintaining a guaranteed minimum match feature. Note that sparse 0 mode P is not position independent, but this position independence is not essential for an information leakage prevention system.

Information Leakage Prevention (ILP) System

FIG. 1 is a high-level schematic diagram of an enterprise sensitive information management (or information leakage prevention) system 100 in accordance with an embodiment of the present invention. The system 100 monitors and manages sensitive information in an enterprise network. The system 100 includes deployment points 110a-c and a server 120. Each of the deployment points 110 can be a computer (e.g., laptop computers, desktop computers), or a device with data access capabilities (e.g., handheld computing devices, embedded devices with a processor and operating or control system), or a network appliance or device through which network traffic flows and may be inspected (e.g., a network gateway, etc.). The server 120 is a computing device that, in accordance with an embodiment of the invention, may perform a signature deployment process. In the signature generation process, generated signatures are distributed from the server 120 to the deployment points 110.

The deployment points 110 and the server 120 are connected through a network 130. The network 130 may be a wired or wireless network or a combination thereof. Examples of the network 130 include the Internet, an intranet, a cellular network, or a combination thereof. It is noted that each of the deployment points 110 and the server 120 are structured to include a processor, memory, storage, network interfaces, and applicable operating system and other functional software (e.g., network drivers, communication protocols, etc.).

Figure 2:
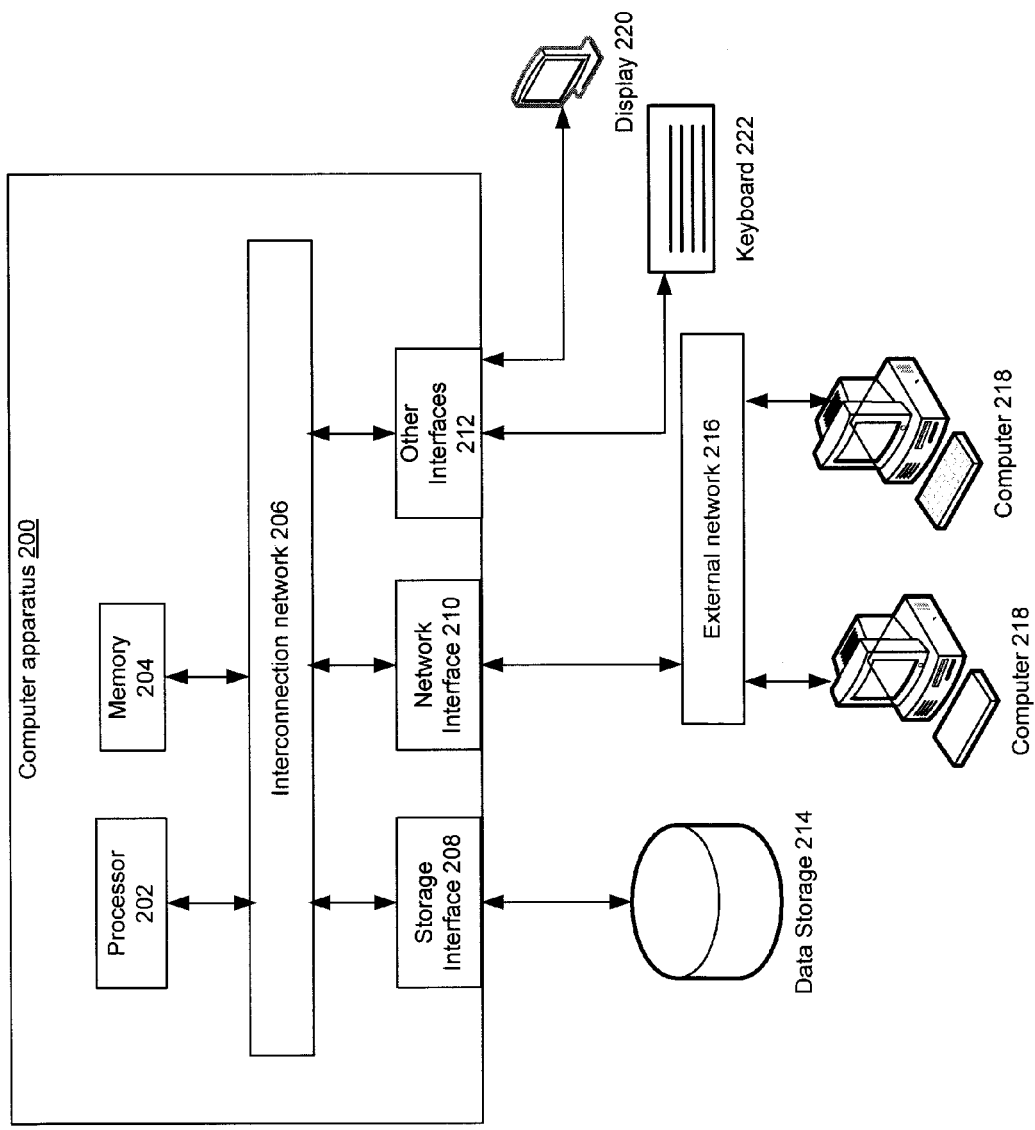
FIG. 2 is a schematic diagram depicting an example computer apparatus which may be configured to perform various method steps in accordance with an embodiment of the invention.

FIG. 2 is a schematic diagram depicting an example computer apparatus 200 which may be configured to perform various method steps in accordance with an embodiment of the invention. Other designs for the computer apparatus may be used in alternate embodiments. As discussed above, embodiments of the present invention may be performed by multiple computer apparatus 200 communicatively interconnected by a network.

As shown in FIG. 2, the computer apparatus 200 comprises a processor 202, a computer-readable memory system 204, a storage interface 208, a network interface 210, and other interfaces 212. These system components are interconnected through the use of an interconnection network (such as a system bus or other interconnection system) 206. The memory 204 may be configured to include, in addition to other components and data, processor-executable instructions to perform various method steps disclosed herein.

The storage interface 208 may be used to connect storage devices 214 to the computer apparatus 200. The network interface 210 may be used to communicate with other computers 218 by way of an external network 216. The other interfaces may interface to various devices, for example, a display 220, a keyboard 222, and other devices.

In an information leakage prevention (ILP) system, there are two phases involving fingerprinting. The first phase is at "crawl time" when the set of documents being protected are fingerprinted. The second phase is at "match time." Match time refers to the matching performed at deployment points 110 to detect information leakage from the sensitive information management system 100.

Sparse 0 Mod P at Crawl Time

As discussed below, under the Sparse 0 Mod P technique disclosed herein, instead of selecting all hash values that are 0 mod P as fingerprints, only one 0 mod P hash value per window may be selected to be a fingerprint. This substantially reduces the amount of fingerprint data in comparison to the Winnowing technique.

Figure 3:
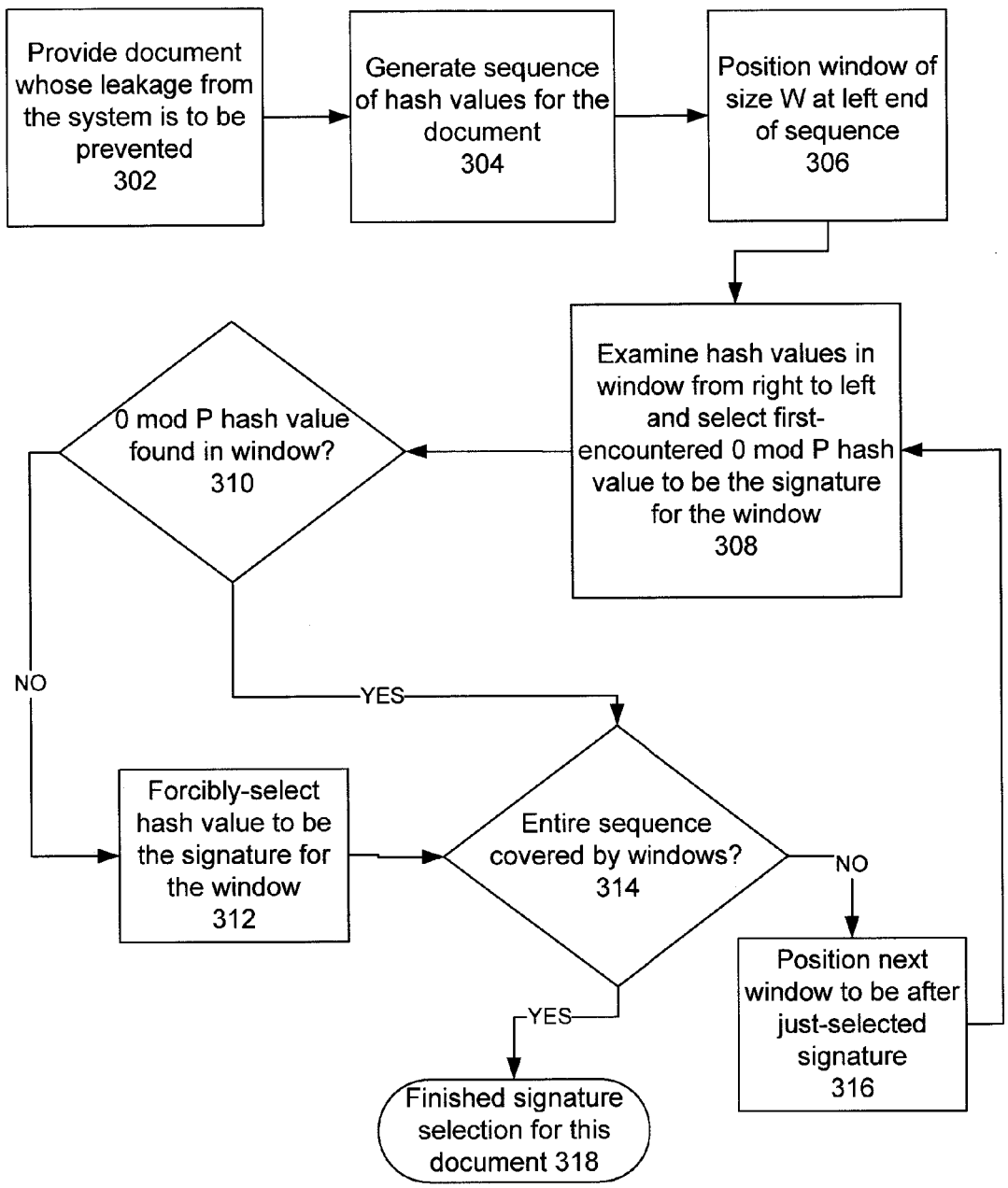
FIG. 3 is a flow chart depicting a method of generating fingerprints for a document at crawl time in accordance with an embodiment of the invention.
Figure 4:
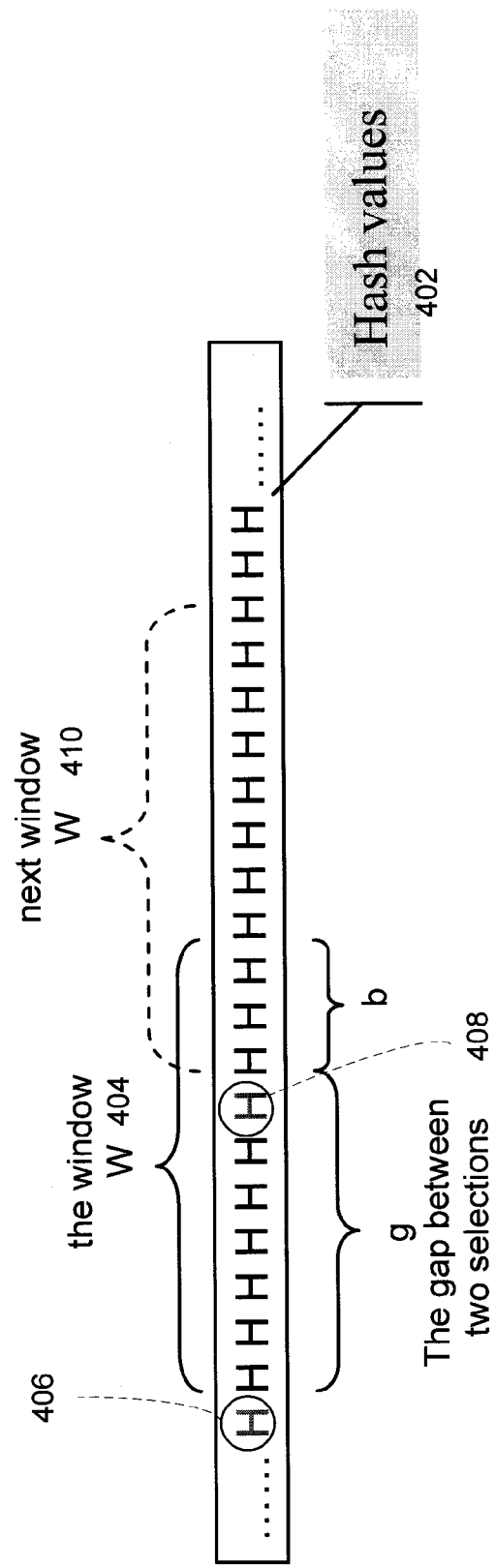
FIG. 4 is a diagram depicting the selection of hash values to be fingerprints in accordance with an embodiment of the invention.

FIG. 3 is a flow chart depicting a method 300 of generating fingerprints for a document at crawl time in accordance with an embodiment of the invention. The method 300 may be performed by executing appropriately configured computer-readable instructions, for example, at a server 120 of an enterprise sensitive-information management system 100. FIG. 4 is a diagram depicting the selection of hash values to be fingerprints in accordance with an embodiment of the invention.

The method 300 of FIG. 3 begins by providing 302 a document whose leakage from the system is to be prevented. A sequence of hash values for the document is then generated 304. As discussed above, the hash values may be generated by dividing the document into k-grams and hashing each k-gram to create a corresponding hash value. In FIG. 4, a sequential set of all hash values 402 from a document is depicted by the sequence of H symbols. Only some of these hash values will be chosen to be fingerprints (signatures). More particularly, under the Sparse 0 Mod P technique, only one 0 mod P hash value per window may be selected.

A window of size W is positioned 306 at a left end of the sequence of hash values. As described further below, this window is re-positioned as the procedure progresses. A currently-positioned window (current window) W 404 is shown in FIG. 4.

Per block 308, hash values within a window may be examined from right-to-left, and the first-encountered 0 mod P hash value may be selected to be the signature for the window. This step may be understood in reference to the example shown in FIG. 4.

Consider the current window W 404 depicted in FIG. 4. Note that the left edge of the current window W 404 begins right after a previously-selected fingerprint 406 which is shown by a circle around the selected H symbol. Starting at the right edge of the current window W 404, a hash value H is examined. If this current hash value H is not 0 mod P, then we go one step to the left and examine the preceding hash value H. If this current hash value H is not 0 mod P, then we go one step to the left and examine the preceding hash value H. This procedure continues until either a 0 mod P hash value is found, or the entire window has been examined.

Provided all hash values H are fully random, the probability of one hash value being 0 mod P would be 1/P. Define b (see FIG. 4) as the hash value count when the first 0 mod P hash value is found in a window. The expected mean value of b is P, and the expected mean value of the gap g is W−P+1.

In the specific case depicted in FIG. 4, the fourth hash value H 408 from the right edge of current window W 404 is a 0 mod P hash value. Hence, this 0 mod P hash value 408 is selected as the one fingerprint (as indicated by the circle around the H symbol) for the current window W 404.

While each sufficiently large window W should usually have at least one 0 mod P hash value, there is a chance that none of the hash values in a window of size W is a 0 mod P hash value. Under the fully random assumption, the probability of a window of size W (where W is the number of hash values in the window) having no hash value which is 0 mod P is $p_{fail}=[(P-1)/P]^W$. If W is much larger than P, the $p_{fail}$ becomes small.

To have a guaranteed match size, there must be at least one hash being selected as a fingerprint in each window. Therefore, although $p_{fail}$ may be very small, a procedure is still needed to handle these instances. A determination 310 is thus made as to whether a 0 mod P hash value was found in each window. If none of the hash values are found to be 0 mod P by the time the left edge of a window is reached, then the procedure 300 forces 312 the selection of a hash value within the window to be a fingerprint.

More particularly, in accordance with an embodiment of the invention, the forcibly-selected hash value may be such that the gap g (see FIG. 4) between this fingerprint and the previous fingerprint is equal to W−P+1. Such a forced selection results in g being approximately W−P+1 whether the 0 mod P selection succeeds or fails. This is because the expected mean value of b (see FIG. 4) is P, and the expected mean value of the gap g is W−P+1. In this embodiment, g will be approximately W−P+1 for successful 0 mod P selections and is set to be W−P+1 for forced selections. Hence, the density D of the signatures for this embodiment is approximately 1/(W−P+1).

Once a fingerprint has been selected from the current window 404, then the next window W 410 is positioned. This next window 410 has its left edge right after the fingerprint 408 selected for the current window 404. The above-described procedure is then repeated for this next window W 410, and so forth until fingerprint selection is completed for windows spanning the entire set of hash values 402. In other words, a determination 314 is made as to whether the entire sequence of hash values H 402 has been covered or spanned by the windows. If not, then the next window is positioned 316 to be right after the just-selected signature. Once the entire sequence is covered, then the signature (fingerprint) selection for the document is completed or finished 318 with two sets of signatures being generated: set A with fingerprints selected by virtue of their being 0 mod P hashes; and set B with fingerprints that were forcibly-selected. For typical values of W and P, fingerprint set A is expected to be much larger than fingerprint set B.

Advantageously, for window sizes W that are much larger than P, this embodiment of the Sparse 0 Mod P technique will produce only about half (50%) of the fingerprints as the Winnowing technique. While generating less fingerprints, Sparse 0 Mod P still has a guaranteed minimum match size of W+K−1 which is the same as that of Winnowing.

Sparse 0 Mod P at Match Time

Figure 5:
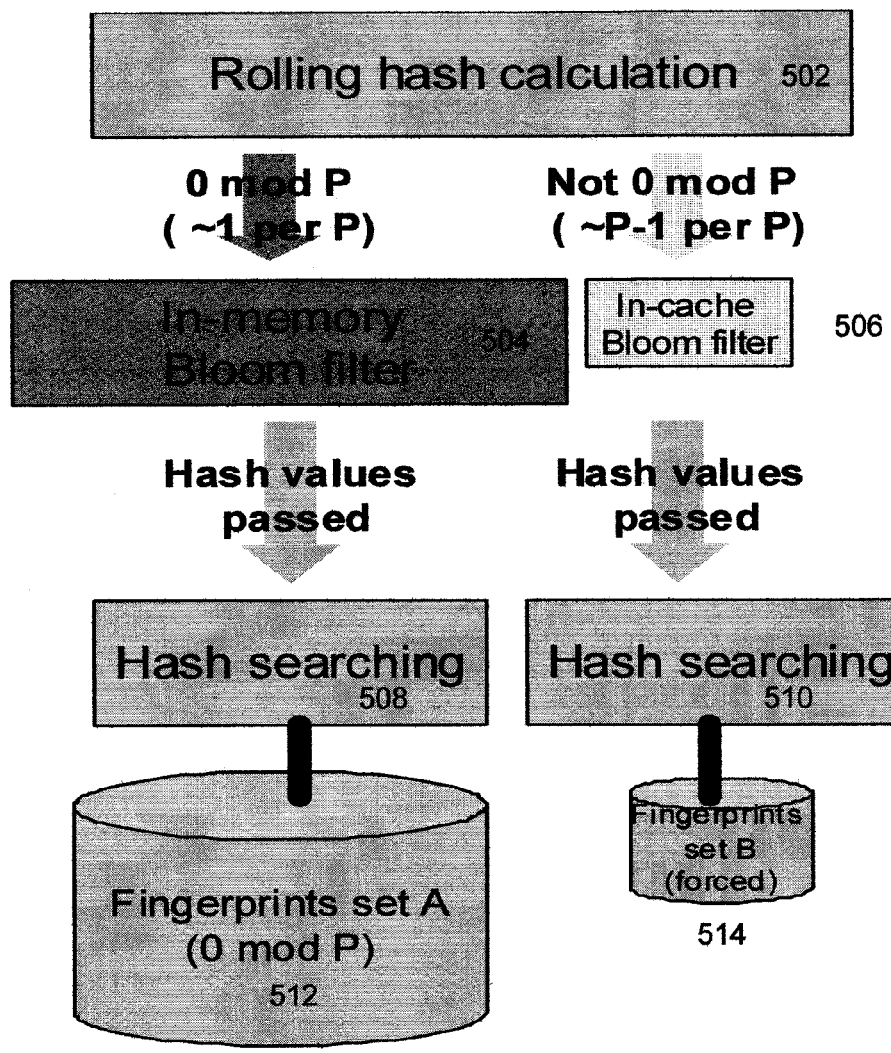
FIG. 5 is a diagram depicting a method performed at match time in accordance with an embodiment of the invention.

FIG. 5 is a diagram depicting a method 500 performed at match time in accordance with an embodiment of the invention. The method 500 may be performed by executing appropriately configured computer-readable instructions, for example, at deployment points 110 of an enterprise sensitive-information management system 100.

A rolling hash calculation 502 is performed on the target document. Here, the target document is the document that is being examined to determine if sensitive information is being leaked from the set of protected documents. The rolling hash calculation proceeds from one end of the target document to the other end and generates a hash value for each k-gram encountered.

The hash values generated by the rolling hash calculation are then examined to determine whether or not they are 0 mod P hash values. Hash values that are 0 mod P (about one hash value per P hash values will be 0 mod P) may then be processed by a first Bloom filter 504. On the other hand, hash values that are not 0 mod P [about (P−1) hash values per P hash values will fall into this category] may be processed by a second Bloom filter 506. The Bloom filters 504 and 506 are used as pre-filters to greatly reduce the number of searches 508 and 510, respectively, performed on the fingerprint sets A 512 and B 514, respectively.

A Bloom filter is a known technique which uses a data structure to quickly determine if an element (such as a hash value) is part of a set (such as a set of fingerprints). A Bloom filter may return a false positive (where the element is indicated to be part of the set, but it is not), but it should not return a false negative (where the element is not indicated to be part of the set, but it is).

The first Bloom filter 504 serves as a filter for fingerprint set A 512, and the second Bloom filter 506 serves as a filter for fingerprint set B 514. As discussed above, fingerprint set A (which includes those fingerprints selected by virtue of their being 0 mod P hashes) is generally expected to be much larger than fingerprint set B (which includes fingerprints that were forcibly-selected).

Hence, the first Bloom filter 504 is preferably configured in main memory of a computer system as an in-memory filter, while the second Bloom filter 506 is preferably configured in cache memory of a computer system as an in-cache filter. The first Bloom filter 504 may be configured in-memory, for example, as a 200 MB (megabyte) Bloom filter which may be configured to have a probability of false positives which is less than 0.001 for a set of 100,000,000 hash values. As long as the fingerprint set B is sufficiently small, for instance, less than 2 million hash values, the second Bloom filter 506 may fit into, for example, a level 2 (L2) cache of a common microprocessor and have high performance.

The scale of the second Bloom filter 506 depends on the number of hash values in fingerprint set B 514. The signatures in fingerprint set B 514 were produced by the above-discussed forced-selection situations.

For a given window of W hash values, consider that there are N unique hash values in the window, N being less than or equal to W. The probability of needing a forced-selection of a fingerprint becomes $p_{fail}=[(P-1)/P]^N$.

FIG. 6 gives a table showing values of $p_{fail}$ given select values of P and N. In particular, $p_{fail}$ values are given for P=8 or 16 and for N=50, 100, 200, or 400.

Now consider the following very conservative and rough estimation. Assume P=16 and that in 10% of the windows N=50, in 20% of the windows N=100 and in 70% of the windows N is greater than or equal to 200. We can then estimate that $p_{fail}$ is less than or equal to 10%×0.04+20%×0.0016+70%×2.5×10$^{-6}$=0.0072. This means that fingerprint set B 514 is expected to include less than one percent of the total number of signatures (the other 99% plus being in fingerprint set A 512. Note, again, that the preceding is a very conservative and rough estimation. Thus, the former described in-cache Bloom filter is shown to be feasible and practical. Based on that, during match time processing, a small fraction (1/P) of hash queries will go to the relatively big and slow part (in-memory filter and Set A) while a large fraction ((P−1)/P) of hash queries will go to the relatively small and fast part (in-cache filter and Set B). Hence, the solution is shown to be advantageously efficient in processing the hash queries.

CONCLUSION

Various embodiments may be implemented using one or more hardware elements and/or one or more software elements.

In general, a hardware element may refer to any hardware structure arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

While particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A process of fingerprinting a document using a computer apparatus, the process comprising:
generating a sequence of hash values for a document, a portion of said hash values to be selected as fingerprints for the document;
positioning a current window over a portion of the sequence of hash values;
examining hash values starting from one end of the current window and selecting a first-encountered hash value that is 0 modulo P to be a fingerprint for the current window, wherein P is a predetermined number; and
forcibly selecting a hash value to be a fingerprint for the current window if no 0 mod P hash value is found in the current window,
wherein said forcibly selecting chooses a hash value at a position W−P+1 in the current window, where W is a number of hash values covered by the window.

2. The process of claim 1, further comprising:
positioning a next window to be right after the fingerprint for the current window; and
examining hash values starting from one end of the next window and selecting a first-encountered 0 mod P hash value to be the fingerprint for the next window.

3. The process of claim 2, further comprising:
continuing said process until the windows span the sequence of hash values for the document.

4. The process of claim 3, further comprising:
forming a first set of fingerprints which includes said fingerprints that are 0 modulo P.

5. The process of claim 4, further comprising:
forming a second set of fingerprints which includes said fingerprints that are forcibly-selected.

6. A computer apparatus for fingerprinting a document, the apparatus comprising:
a processor configured to execute computer-readable instructions;
memory configured to store data, including said computer-readable instructions; and
a communications system interconnecting said processor and memory,
wherein said computer-readable instructions are configured to generate a sequence of hash values for a document, a portion of said hash values to be selected as fingerprints for the document, position a current window over a portion of the sequence of hash values, examine hash values starting from one end of the current window and selecting a first-encountered hash value that is 0 modulo P to be a fingerprint for the current window, wherein P is a predetermined number, and forcibly select a hash value to be a fingerprint for the current window if no 0 mod P hash value is found in the current window, wherein said forcible selection chooses a hash value at a position W−P+1 in the current window, where W is a number of hash values covered by the window.

7. The computer apparatus of claim 6, wherein the computer-readable instructions are further configured to position a next window to be right after the fingerprint for the current window, and examine hash values starting from one end of the next window and select a first-encountered 0 mod P hash value to be the fingerprint for the next window.

8. The computer apparatus of claim 7, wherein the computer-readable instructions are further configured to continue said process until the windows span the sequence of hash values for the document.

9. The computer apparatus of claim 8, wherein the computer-readable instructions are further configured to form a first set of fingerprints which includes said fingerprints that are 0 modulo P.

10. The computer apparatus of claim 9, wherein the computer-readable instructions are further configured to form a second set of fingerprints which includes said fingerprints that are forcibly-selected.

11. A process of fingerprinting a document using a computer apparatus, the process comprising:

generating a sequence of hash values for a document, a portion of said hash values to be selected as fingerprints for the document;

positioning a current window over a portion of the sequence of hash values;

examining hash values starting from one end of the current window and selecting a first-encountered hash value that is 0 modulo P to be a fingerprint for the current window, wherein P is a predetermined number;

forcibly selecting a hash value to be a fingerprint for the current window if no 0 mod P hash value is found in the current window;

positioning a next window to be right after the fingerprint for the current window;

examining hash values starting from one end of the next window and selecting a first-encountered 0 mod P hash value to be the fingerprint for the next window;

continuing said process until the windows span the sequence of hash values for the document;

forming a first set of fingerprints which includes said fingerprints that are 0 modulo P; and forming a second set of fingerprints which includes said fingerprints that are forcibly-selected.

* * * * *